United States Patent [19]
Zimmerer

[11] 3,805,904
[45] Apr. 23, 1974

[54] METHOD AND APPARATUS ADAPTED FOR HIGH-SPEED WEIGHING

[75] Inventor: Robert W. Zimmerer, Boulder, Colo.

[73] Assignee: Scientech, Inc., Boulder, Colo.

[22] Filed: Nov. 17, 1972

[21] Appl. No.: 307,730

[52] U.S. Cl............ 177/54, 177/52, 177/1, 209/121
[51] Int. Cl............................................. G01g 13/00
[58] Field of Search.................. 177/1, 52–58, 177/83, 264; 73/432 R, 432 A, 432 CR; 209/121, 332

[56] References Cited
UNITED STATES PATENTS
2,623,636   12/1952   Pounds .................. 209/121
2,781,993   2/1957   Magnuson................ 177/1
2,515,412   7/1952   Lee........................ 177/58 X
3,550,771   12/1970   Spyropoulds ........... 177/1

Primary Examiner—Richard B. Wilkinson
Assistant Examiner—Vit N. Miska
Attorney, Agent, or Firm—Thomas W. O'Rourke

[57] ABSTRACT

A device adapted for high-speed weighing of multiple articles, and a method for such weighing, wherein an article is supported in the vertical direction and accelerated in a horizontal direction to produce a horizontal force which is measured preferably independent of the force produced by gravity. The device includes article support means rotatable in a horizontal plane, the article support means being connected directly or indirectly to a stable support through means for sensing force only in a horizontal direction. The article is preferably maintained at a constant speed while undergoing horizontal acceleration.

16 Claims, 4 Drawing Figures

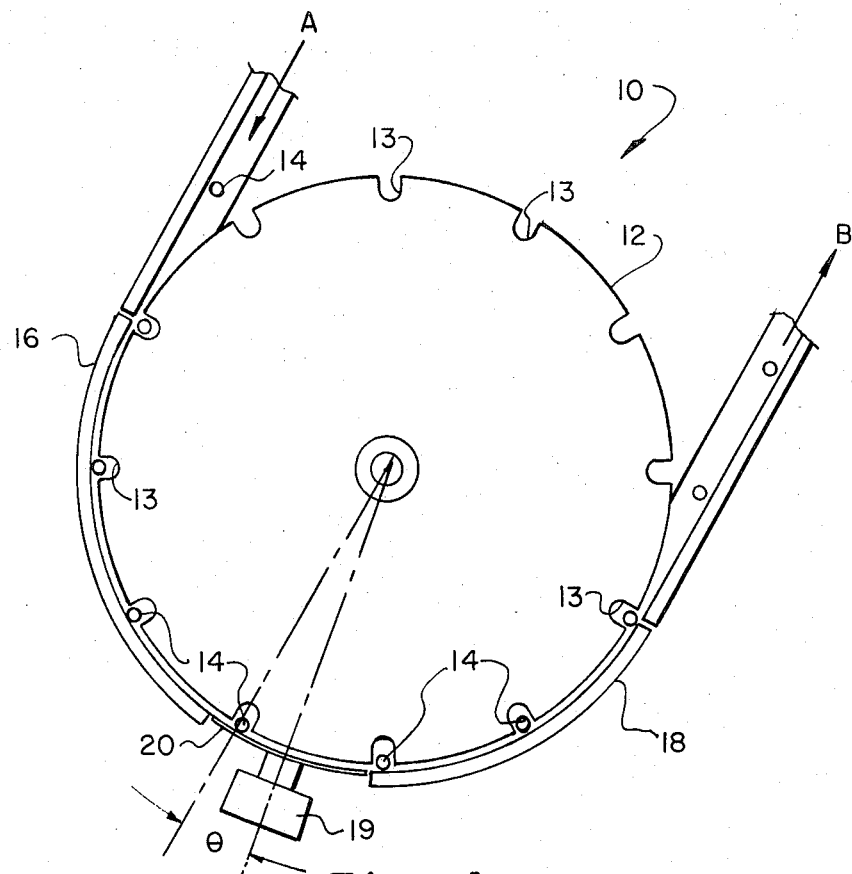
*Fig_1*
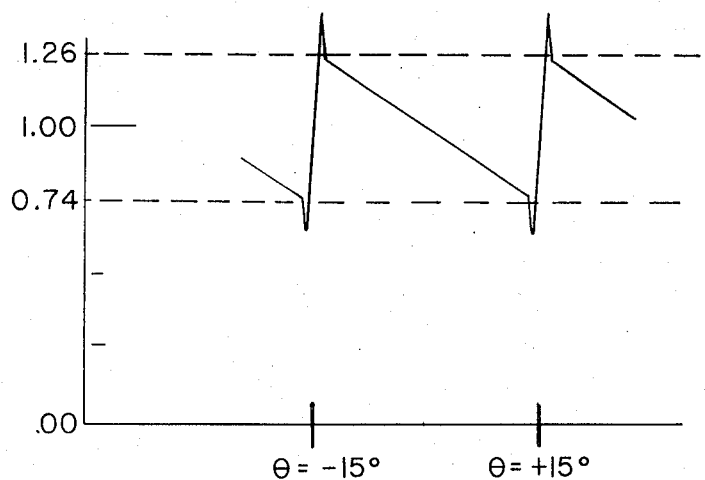
*Fig_2*

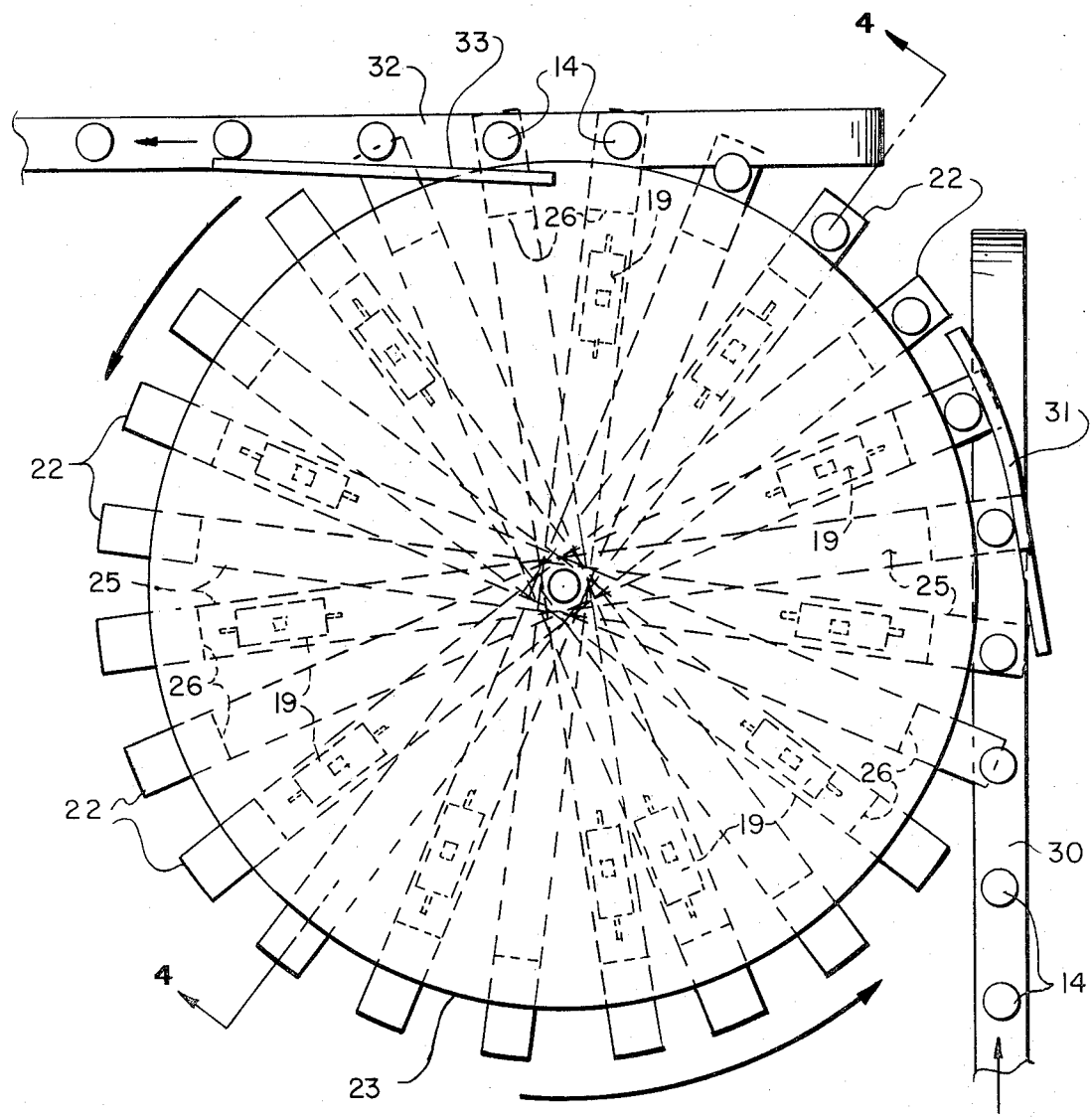
Fig_3
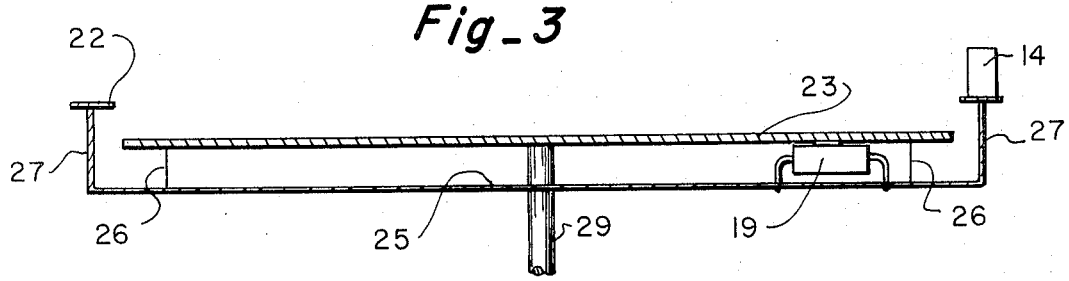
Fig_4

METHOD AND APPARATUS ADAPTED FOR HIGH-SPEED WEIGHING

BACKGROUND OF THE INVENTION

1. Field of the Invention

The present invention relates to apparatus and method adapted for high-speed continuous weighing of multiple articles.

2. Description of the Prior Art

Heretofore, the art and science of weighing has been preoccupied with utilizing the force resulting from gravity acting upon the object to be weighed. Classically, this force has been measured by elastically stretching a spring according to Hooke's Law or by matching the force to that produced by a known mass acting through a known balance beam. Under static conditions, this is quite satisfactory, if outdated. However, under dynamic conditions, such as a food canning or beverage filling line, the traditional approach has been found to be grossly wanting. Since such lines often operate at "speeds" of 600 to 1,200 articles per minute, the time available for weighing each article is clearly quite limited. It is impossible to place moving articles on a platform, stop each article for weighing, and then remove each article at these rates. While it is now possible to electronically reduce the period required for weighing, such electronic means necessarily broadens the vibratory frequencies to which the apparatus is receptive. Thus, the need to deal with induced vibration in the weighing device tends to offset the advantages of electronically enhanced weighing response under such high speed conditions. Further, the forces required to instantaneously stop and start even a relatively light article for weighing are quite high and may damage the article to be weighed, induce wear, induce the above-mentioned descriptive vibratory input or compromise mechanical dependability.

The more apparent approach of sliding the articles over a spring-mounted platform has long been outmoded. An example of the current state-of-the-art now in relatively wide spread use, as well as confirmation of the above discussion, can be found in U.S. Pat. No. 3,545,611, issued Dec. 8, 1970. The system disclosed and discussed in this patent relies upon the deflection rate of a vibrating wire in conjunction with electronic means to classify by mass articles dropped on the wire. This disclosure, while certainly workable, illustrates the recognized need to depart from direct weighing as well as the complications to which the art has resorted to in order to uprate the speed of weighing to approach that of processing lines. However, most of the commonly utilized check weighers for canning lines cannot operate efficiently above rates of about 350 cans per minute. Similar problems are to be found in the weighing of other articles from pills to industrial products.

Put succinctly, direct weighing has, in general, been unable to cope with high-speed weighing and has been abandoned for all practical purposes in other than sampling situations. Current attitudes toward even occasional short weigh require check weighing of each and every article in many business lines.

SUMMARY OF THE INVENTION

The present invention, which provides for continuous direct weighing of multiple articles at high speeds not previously attainable, comprises, in part, a method for supporting articles to completly cancel the conventionally measured forces resulting from gravity, moving the article in a horizontal plane through a curvilinear path and measuring the horizontal force produced by the horizontal acceleration of the article. Preferably, the article is maintained at a constant speed while the direction of travel is altered. This permits an uninterrupted flow of articles from the line to the weighing device and back to the processing line. Since the article velocity as used in the equation $F = d(mv)/dt = m\, dv/dt$, has a directional sense as well as a magnitude, i.e., a vector quantity, it is only necessary to change the direction of travel to produce a corresponding force. The simplest example of this and a preferred approach of the instant invention is to move the article through at least a portion of a circle whereupon the measured force is centrifugal force. However, it is not necessary to deal with constant speed or that the curvilinear path be circular.

While the simplicity of this method is an outstanding advantage, a number of more subtle advantages exist. Since the angular velocity as well as the curvilinear path can be varied by choice, as opposed to the fixed nature of gravity, the nature and magnitude of the generated force can be tailored to varying needs. For instance, with fragile articles, a gently curving path in conjunction with relatively low speeds can be utilized to limit the induced force. In the case of more conventional durable articles, high speeds can be utilized to generate relatively high forces which permit less sensitive measurement of the resulting forces. Put simply, since the acceleration of the article can be controlled, the corresponding force generated by a given mass can be, at will, greater or less than the fixed force produced by gravity in conventional weighing.

Also, the force measuring means can be moved concurrent with the article to permit relatively extended periods in which to weigh an article. The use of multiple force sensing means in conjunction with this approach permits concurrent existence of the apparently incompatible ends of an extended weighing period and high line rates.

The apparatus of the instant invention, in general, comprises a rotating means, preferably a wheel, horizontally mounted to receive and carry articles through a curvilinear path, preferably a circle. Force measuring means, mounted either internally or externally of the rotating means, is included in the linkage securing the article and thus able to measure the horizontal force generated. While specific embodiments will be described in more detail below, it is to be recognized that the article handling art per se, such as loading and unloading means for can lines, is highly developed. Problems of transporting and individually loading articles onto the device of the instant invention is highly analogous to that of loading articles in, for instance, a rotary filling apparatus and will not be described in detail in view of the familiarity of the art with such devices.

Accordingly, it is an object of this invention to provide apparatus and method for directly measuring the mass of an article independent of the influence of gravity.

Another object of this invention is to provide simple, direct means for continuously weighing multiple articles at high rates.

Yet another object of this invention is to provide apparatus which can be varied to alter the ratio of force generated relative to the mass of the articles either above or below that conventionally produced by gravity.

A further object of this invention is to provide apparatus and method for weighing articles without interrupting high line rates.

A still further object of this invention is to provide apparatus which is capable of continuously and accurately weighing articles from a production line at high speeds without altering the speed at which the article travels on the production line.

These and other objects and features of this invention will be apparent from the drawings and following description.

THE DRAWINGS

In the drawings:

FIG. 1 is a top view of a schematic illustration of an embodiment of the instant invention;

FIG. 2 is a draft of the force/time relationship of a specific embodiment of the instant invention;

FIG. 3 is a top view of a second embodiment of the instant invention; and

FIG. 4 is a simplified front section of the second embodiment of the instant invention.

DETAILED DESCRIPTION OF THE INVENTION

With regard to the drawings in which like components are designated by like reference numerals throughout the figures, a preferred apparatus for high-speed weighing of articles is illustrated in FIG. 1 and is generally indicated by reference numeral 10.

Apparatus 10 comprises a rotating member 12 having slots 13 defined therein and spaced evenly about the periphery of rotating member 12. Articles 14 are fed into slots 13 by any of the conventional means 15 indicated but not detailed in the direction generally indicated by arrow A. Entrance retaining ring 16 serves to confine articles 14 in slots 13 as rotating member 12 moves in a counterclockwise direction as illustrated. Exit retaining ring 18 serves the same purpose. Force sensor 19, positioned between entrance retaining ring 16 and exit retaining ring 18, is attached to a force sensor retaining ring 20. Force sensor retaining ring 20 is positioned between and adjacent to, but slightly spaced from, entrance retaining ring 16 and exit retaining ring 18. Accordingly, articles 14 are accelerated at least with regard to direction by rotating member 12 and retaining rings 16, 18 and 20. After each article 14 moves past exit retaining ring 18, it is removed by conventional means 17 indicated but not detailed in the direction generally indicated by arrow B.

As the articles 14 pass face sensor retaining ring 20, the articles 14 bear thereupon and, accordingly, the force generated by articles 14 is registered by force sensor 19 through force sensor retaining ring 20. Slots 13 are spaced in such a manner as to present only one of the articles 14 at force sensor retaining ring 20 at any given time.

Apparatus 10 will perhaps be better understood and appreciated with reference to a specific configuration. Assuming θ, an angle relative to the center line of force sensor 19, to be 15°, and rotating member 12 to have a 4-inch diameter with 12 slots 13 spaced evenly on the periphery thereof as an example. With rotating member 12 moving at a rate of 100 r.p.m., articles 14 would be supported by force sensor retaining ring 20 for a period of about 40 milliseconds. Force sensors capable of registering accurately forces exerted for periods as short as 40 millicycles are known to the art. One example is described in some detail in U.S. Pat. No. 3,680,650 issued Aug. 1, 1972, to Robert W. Zimmerer. The specified configuration will weigh articles 14 at a rate of 1,200 articles per minute with the articles 14 moving at a linear speed of 20 inches per second. The force of article 14 bearing upon force sensor retaining ring 20 will be about one-half the weight of the article.

It will be noted that article 14 presents some minor spurious forces. These can be expressed as frictional force times sine 15° +°centrifugal force times Cos 15° when the article 14 first encounters force sensor retaining means 20. On the other hand, as article 14 leaves force sensor retaining means 20, the force can be expressed as centrifugal force times Cos 15° − frictional force times sine 15°. In the case of a large coefficient of friction, i.e., 1, the result is illustrated in FIG. 2 wherein the force bearing upon force sensor 19 is presented as the ordinate and the angular displacement relative to force sensor 19 is presented on the abscissa. It will be noted that certain transitional forces, which constitute noise, are present as article 14 first bears upon force sensor retaining ring 20 and also as article 14 leaves force sensor retaining ring 20. It is a simple matter to electronically eliminate these transitional signals. However, from the time article 14 is first presented in a steady state mode until the time it enters the exit transitional phase, the variation is, in essence, a straight line with the average corresponding to unity for the true signal. Thus, the signal from force sensor 19 is averaged over the 40 milliseconds (about 30° of rotation) of force presented thereto to obtain a signal which is within 1 percent of the unity force. With fast response force sensors, it can be appreciated that much less than the 30° sector can be used to obtain the force signal, thus further minimizing noise due to sliding friction. Even this minimal operation can be avoided if the simplicity of the above-discussed embodiment is compromised to a minor extent.

Yet another embodiment of the invention is that shown in FIGS. 3 and 4.

In this second embodiment, the article 14 to be weighed specifically is a can, though, of course, the illustrated apparatus has much broader general utility. As shown, a series of pans 22 are suspended from a support 23 by means of beam 25 and flexible suspension members 26 and upright 27. Thus, while suspension members 26 support beam 25 with regard to verticle forces, beam 25 is free to move laterally insofar as described to this point. However, lateral movement is precluded by force sensor 19 which links beam 25 to support 23. Force sensor 19 does not permit any substantial movement but measures the force required to prevent movement in either direction parallel to beam 25. Pans 22 provided on each end of each beam 25 are thus secured laterally be means of force sensor 19.

A substantial number of beam assemblies as described can be arrayed to produce a semi-continuous circle of pans 22. While not shown in detail, it will be understood that each beam 25 is supported and secured only by suspending members 26 and force sensor 19 and are mutually independent of one another and of rotating shaft 29. This is accomplished for instance by detouring or biforcating each beam 25 around rotating shaft 29 and locating each beam 25 in a distinct plane as it passed around rotating shaft 29.

Each beam 25 and associated pans 22, suspension members 26, uprights 27 and the portion of force sensor 19 attached to beam 25 are, as on assembly, dynamically balanced around rotating shaft 29. When the assembly is rotated around rotating shaft 29, no substantial lateral force is produced. Any minor lateral forces will be transmitted and quantified by force sensor 19 which can be "zeroed" at any constant rate of rotation to eliminate the effect of such minor unbalance.

In operation, article 14 is carried on feed belt 30 in a synchronized manner. Thus, when an article 14 is disposed above a pan 22, feed guide 31 displaces article 14 from feed belt 30 onto pan 22. Article 14 then becomes a part of the above-described beam assembly and induces an unbalanced state in such assembly. Since the placement of article 14 on pan 22 is quite accurate and reproducible, the unbalance is directly related to the mass of article 14 and is absorbed and recorded by force sensor 19. After the mass of article 14 is determined by force sensor 19, pan 22 has rotated into position over exit belt 32 and article 14 is displaced from pan 22 onto exit belt 32 by exit guide 33. The location of belts 30 and 32 and guides 31 and 33 may be varied to greater or lesser arcs of travel to provide increased or decreased weighing periods. Other such variations of perimeters will, along with the great variability of the described apparatus, be apparent to those skilled in the art.

Minor details which are simple in concept but difficult to illustrate have not been shown in order to facilitate ease of understanding of this invention. For instance, the wiring from force sensors 19 would preferably be routed coaxially down rotating shaft 29 and interfaced with stationary contacts by means of slip rings. Also, synchronization of belts 30 and 32 would be achieved by interconnecting the drive means (not shown) for the belts with the drive (not shown) for rotating shaft 29. Proper spacing of article 14 on feed belt 30 could for instance be attained by a feed screw (not shown) similarly interconnected with the above drives. All of these expedients are well known within the art and detailed illustrations would merely complicate the disclosure and obscure the novel aspects of the invention.

Other uses will also be apparent to those skilled in the art. For instance, in addition to weighing articles of fixed mass, the contents of a container, either liquid or solid, could be conducted to the container while the container is being weighed and moving. When the proper total weight is reached, flow of the contents can be automatically terminated. Other such high rate weighing uses will similarly be recognized in view of the unique advantages of the instant invention.

Although two embodiments of the present invention have been illustrated and described, it is anticipated that various changes and modifications will be readily apparent to those skilled in the art and that such changes may be made without departing from the scope of the invention as defined by the following claims.

What is claimed is:

1. A method of weighing articles independent of the force resulting from gravity comprising, supporting the articles in a plane perpendicular to the direction of gravity, moving each article through a curvilinear path in the plane perpendicular to the direction of gravity at a known speed and concurrently sensing the centrifugal force generated in directions entirely within said plane by means of a force transducer included in the linkage carrying each article through the curvilinear path.

2. A method as set forth in claim 1 in which the article is rotated on a pan in a circular path in the plane perpendicular to the direction of gravity and the pan is urged in the circular path through a linkage secured laterally solely by a force sensor whereby lateral force generated by the mass of the article is sensed by the force sensor.

3. A method as set forth in claim 1 wherein the articles are carried on the periphery of a rotating wheel in a circular path.

4. A method as set forth in claim 3 in which said articles are urged into the circular paths by fixed retaining means adjacent the wheel and the force exerted on a least a portion of the retaining means is sensed by a force sensor supporting at least a portion of the retaining means.

5. A method of weighing articles independent of the force resulting from gravity comprising, rotating a pan suspended on a balanced support assembly in a horizontal plane and around a point remote from pans, sequentially placing articles on the pan at a given angular position and carrying each article through a portion of a revolution, sensing the lateral centrifugal force generated by the mass of each article as it is rotated, removing each article from the pan before completion of a revolution, and placing a subsequent article on the pan at the given angular position.

6. A method as set forth in claim 5 in which a plurality of pans are concurrently rotated and a plurality of articles are concurrently and individually weighed.

7. Apparatus for weighing articles comprising, means for securing an article in a horizontal plane, means for moving the article along a curvilinear path in the horizontal plane, and force sensor means operably connected to the article through the means for moving the article and article securing means to laterally support the article and measure lateral centrifugal forces generated by the article as it moves along the curvilinear path.

8. Apparatus as set forth in claim 7 in which the means for moving the article along a curvilinear path includes a horizontal wheel mounted for rotation and having slots defined therein and fixed retaining means located adjacent to but spaced from the wheel, and the force sensor means supports at least a distinct portion of the retaining means.

9. Apparatus as set forth in claim 7 in which the means for moving the article along a curvilinear path includes a beam fixedly supported in the vertical direction but movably mounted with respect to lateral movement, the article securing means includes at least one pan secured at one extreme of the beam for receiving an article, and the force sensor means is fixedly mounted and attached to the beam to prevent lateral movement of the beam and to measure the lateral force exerted by the article on the beam.

10. Apparatus as set forth in claim 9 in which the beam and pan are substantially dynamically balanced for rotation.

11. Apparatus for weighing articles comprising, a horizontally disposed rotatably mounted wheel having slots defined therein, the slots being closed at the bottom portion thereof, at least one retaining ring mounted closely adjacent to but spaced radially from the wheel, a horizontally oriented force sensor supporting at least one of the retaining rings for measuring centrifugal force and means for rotating the wheel whereby articles placed in the slots bear against the retaining rings and are weighed by the force sensor.

12. Apparatus for weighing articles comprising, a support mounted for rotation in a horizontal plane around a vertical axis, a beam suspended from said support to rotate with the support and free to move laterally relative to the support, at least one article securing means attached to the beam adjacent one end thereof, and a force sensor secured to the support and to the beam to measure lateral centrifugal forces existing between the support and the beam as a result of articles placed upon the article securing means during rotation.

13. Apparatus as set forth in claim 12 in which the beam, article securing means, suspension and attached force sensor are dynamically balanced for rotation.

14. Apparatus as set forth in claim 12 in which a plurality of beams and associated suspension, article securing means and force sensors are suspended from the support.

15. Apparatus as set forth in claim 13 in which each beam has two article securing means, one each of which is disposed adjacent each end of the beam.

16. Apparatus for weighing articles comprising, means for carrying articles through a curvilinear path, means for supplying articles to the means for carrying articles, means for removing articles from the means for carrying articles and force sensing means for determining the centrifugal force exerted by an article as a result of the article being carried through the curvilinear path.

* * * * *